(12) United States Patent
Liu et al.

(10) Patent No.: US 8,176,111 B1
(45) Date of Patent: May 8, 2012

(54) LOW LATENCY FLOATING-POINT DIVIDER

(75) Inventors: Jianhua Liu, San Jose, CA (US); Gregg William Baeckler, San Jose, CA (US)

(73) Assignee: Altera Corporation, San Jose, CA (US)

( * ) Notice: Subject to any disclaimer, the term of this patent is extended or adjusted under 35 U.S.C. 154(b) by 1151 days.

(21) Appl. No.: 12/008,785

(22) Filed: Jan. 14, 2008

(51) Int. Cl.
*G06F 7/487* (2006.01)

(52) U.S. Cl. ......................... 708/504; 708/654

(58) Field of Classification Search .................. None
See application file for complete search history.

(56) References Cited

U.S. PATENT DOCUMENTS

| 5,020,017 | A | * | 5/1991 | Ooms et al. ................... 708/650 |
| 5,249,149 | A | * | 9/1993 | Cocanougher et al. ....... 708/504 |
| 5,475,630 | A | * | 12/1995 | Briggs et al. .................. 708/654 |
| 5,563,818 | A | * | 10/1996 | Agarwal et al. ............... 708/400 |
| 6,088,453 | A | * | 7/2000 | Shimbo .......................... 380/28 |
| 7,007,058 | B1 | * | 2/2006 | Kotlov ........................... 708/654 |
| 7,467,174 | B2 | * | 12/2008 | Wang et al. ................... 708/504 |
| 7,979,486 | B2 | * | 7/2011 | Harrison et al. .............. 708/654 |

OTHER PUBLICATIONS

Liu, Jianhua et al. "An Iterative Division Algorithm for FPGAs." FPGA '06, Feb. 22-24, 2006. p. 83-89.

* cited by examiner

*Primary Examiner* — David H Malzahn
(74) *Attorney, Agent, or Firm* — Mauriel Kapouytian & Treffert LLP; Michael Mauriel

(57) ABSTRACT

An improved method and apparatus for performing floating-point division is disclosed. In a particular embodiment, fractional operands are pre-scaled and an estimate of a reciprocal of the pre-scaled fractional divisor is obtained from a lookup table using a portion of the bits of the pre-scaled fractional divisor. This value is used to scale the fractional operands and a multiply-add operation is used based on principles of series expansion to compute a final result with an acceptable degree of accuracy.

22 Claims, 4 Drawing Sheets

LOW LATENCY FLOATING-POINT DIVIDER

BACKGROUND OF THE INVENTION

The present invention relates to methods and structures for using an electronic device to accomplish division.

Division is the most costly of fundamental arithmetic operations. It is typically performed iteratively and low-latency division is difficult to achieve due to data dependency between adjacent iterations.

Computers typically use floating-point numbers, which allow for efficient expression of and operation on both very large and very small numbers. Dividing two floating-point numbers requires determining the sign, exponent, and the fractional portion of the quotient. Operations to determine the sign and exponent are very simple, low cost, and fast. However, determining the quotient's fractional portion is much more difficult to do efficiently and quickly. Determining the fractional portion requires dividing two numbers which can be several bits long.

The shift-subtract division algorithm is widely used for low cost division. It generates a one-bit partial quotient after each iteration, but, for standard single precision floating-point numbers, takes 24 iterations to reach a result. The radix-4 (or "SRT") algorithm provides somewhat higher performance. It produces a two-bit partial quotient after each result and can produce a result for single precision floating-point numbers in 12 iterations. Some algorithms use series and/or Taylor expansion estimation to achieve higher performance, but are either hardware intensive and/or require iterations that make complex calculations insufficiently efficient.

For highly complex calculations, there is a need to find a lower latency and more hardware-efficient solution than the solutions previously known.

SUMMARY OF THE INVENTION

The present invention provides an improved method and apparatus for performing floating-point division.

In a particular embodiment, fractional operands are pre-scaled and an estimate of a reciprocal of the pre-scaled fractional divisor is obtained from a lookup table using a portion of the bits of the pre-scaled fractional divisor. This value is used to scale the fractional operands. A multiply-add operation is used based on principles of series expansion to compute a final result with an acceptable degree of accuracy.

BRIEF DESCRIPTION OF THE DRAWINGS

The novel features of the invention are set forth in the appended claims. Several aspects of a particular embodiment of the invention are described by reference to the following figures.

DETAILED DESCRIPTION OF THE EXEMPLARY EMBODIMENTS

The following description is presented to enable any person skilled in the art to make and use the invention, and is provided in the context of particular applications and their requirements. Various modifications to the exemplary embodiments will be readily apparent to those skilled in the art, and the generic principles defined herein may be applied to other embodiments and applications without departing from the spirit and scope of the invention. Thus, the present invention is not intended to be limited to the embodiments shown, but is to be accorded the widest scope consistent with the principles and features disclosed herein.

Figure 1:
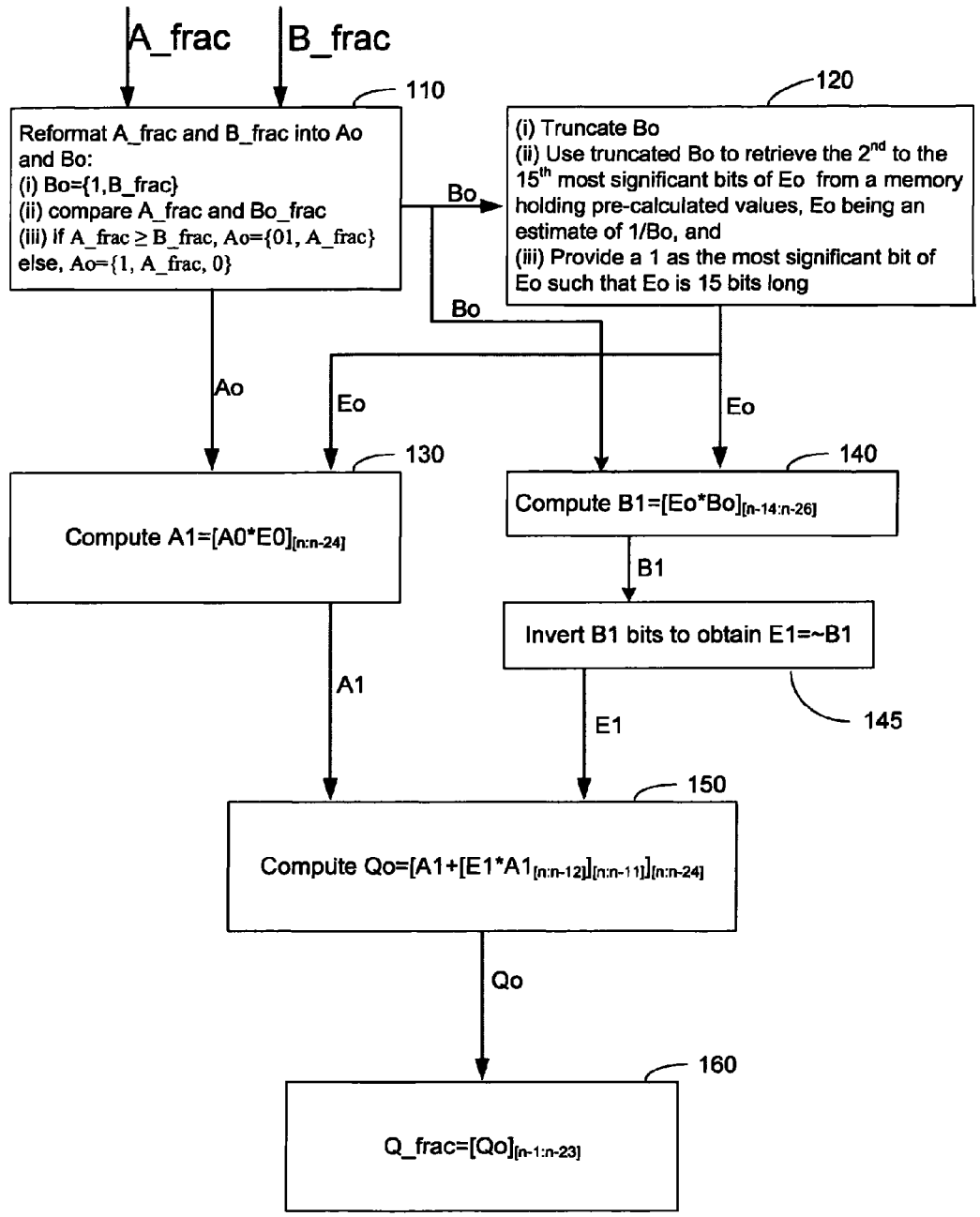
FIG. 1 illustrates a method consistent with a particular embodiment of the present invention.

FIG. 1 shows an exemplary method 100 of using an electronic device to accomplish low latency division of two numbers in accordance with an embodiment of the present invention. In the illustrated example, method 100 calculates Q_frac, the quotient of A_frac divided by B_frac. In this example, A_frac and B_frac are the fractional portions of respective floating-point numbers A and B. Source fractional dividend A_frac and source fractional divisor B_frac are received by step 110.

"Fractional" in this context simply means that the bits represent the portion of the floating-point number to the right of the radix point.

In general notation, without reference to IEEE standard representations, a binary form floating-point number has a fractional portion represented by the bits to the right of the radix point. For example, the number $1.010110 \times 2^{14}$ has a fractional portion represented by the bits 010110. As another example, $-1.1110 \times 2^{-3}$ has a fractional portion represented by the bits 1110.

However, IEEE standard 754 defines how floating-point numbers are to be represented for use by electronic computational devices. In the "single precision" 32-bit representation, the fractional portion is represented by 23 bits. Therefore, with respect to the above example, the fractional portion of $1.010110 \times 2^{14}$ would be represented in 23 bits with 17 trailing zeros and thus would be represented with the following bits: 01011000000000000000000. Similarly, the fractional portion of $1.11111111111101001001011101 \times 2^{-3}$ would be represented in 23 bits by truncating to 23 bits (with or without rounding) and would be represented by the following bits: 11111111111010010010111. The methods and structures disclosed herein will be described with respect to division of 23-bit numbers to be consistent with the IEEE standard bit length of a floating-point number's fractional portion. However, the general principles of the present invention are applicable to numbers of different lengths.

For ease of illustration and explanation only, a specific range of bits of a number will be sometimes be referenced herein according to the following convention: The subscript "n" will refer to the most significant bit and the subscript "0" will refer to the least significant bit. The following examples illustrate this more general notation. "$x_n \ldots x_0$" or "$X_{[n:0]}$" will refer to all the bits; "$x_{n-1} \ldots x_{n-14}$" or "$X_{[n-1:n-14]}$" would refer to the 2$^{nd}$ through the 15$^{th}$ most significant bits; and "$x_{14} \ldots x_0$" or "$X_{[14:0]}$" would refer to the least significant 15 bits of the number. If the total number of bits is known, then instead of "0," the subscript n–y or the like might be used where y is one less than the total number of bits. For example, the least significant 15 bits of a 25 bit number might be represented as $x_{[n-10]} \ldots x_{[n-24]}$ or $X_{[n-10:n-24]}$. A number may be "truncated" to only a certain number of bits. For example, a number truncated to its 15 most significant bits will be represented as $X_{[n:n-14]}$.

Continuing with the description of step 110, the bits representing the fractional portions A_frac and B_frac of the floating-point numbers A and B—in this example A_frac and B_frac each being represented by 23 bits—are pre-scaled to obtain pre-scaled fractional numbers Ao and Bo respectively.

To more easily distinguish the numbers, A_frac and B_frac are referenced in this example as "source" fractional numbers and Ao and Bo are referenced as "pre-scaled" fractional numbers. This simply references the fact the A_frac and B_frac are used to obtain Ao and Bo and is not intended to have any narrowing meaning. A_frac and B_frac are pre-scaled and rewritten as Ao and Bo such that $\frac{1}{2} \leq Bo < 1$ and $\frac{1}{2} \leq Ao/Bo < 1$. In the illustrated example, the following procedures implement this pre-scaling: (i) a leading "1" is added to B_frac such that Bo is written as 1B_frac. In other words, a concatenation is performed that may be represented by $\{1, x_n \ldots x_{n-22}\}$ where $x_n \ldots x_{n-22}$ are the bits representing B_frac ($x_n$ being the most significant bit and $x_{n-22}$ being the least; note that since B_frac is assumed to conform to the IEEE standard, it only has 23 bit, therefore $x_{n-22}$ represents the least significant bit in that context); (ii) A_frac and B_frac are compared and (iii) if A_frac$\geq$B_frac, then Ao is written as 01A_frac, i.e., Ao=$\{01, x_n \ldots x_{n-22}\}$ where $x_n \ldots x_{n-22}$ are the bits representing A_frac, else (i.e. if A_frac<B_frac) Ao is written as 1A_frac0, i.e. Ao=$\{1, x_n \ldots x_{n-22}, 0\}$ where $x_n \ldots x_{n-22}$ are the bits representing A_frac.

At step 120, Eo, an estimate of 1/Bo, is obtained from a memory (which may, in some embodiments, be a look-up table, ROM, or similar memory) of the electronic device. The memory is pre-stored with values representative of the reciprocals of Bo calculated to 15-bits and calculated based on the most significant 15 bits of Bo. More specifically, Bo is truncated to 15 bits, a least significant 1 ("ls1") is added to the last bit, and the reciprocal of the result is truncated to 15 bits. This may be represented by $Eo=[1/(Bo_{[n:n-14]}+ls1)]_{[n:n-14]}$. The operation of adding an ls1 in binary math, as will be understood by those skilled in the art, involves changing a 0 to a 1 if 0 is the least significant bit or, if 1 is the least significant bit, changing the 1 to 0 and carrying the addition of 1 throughout the bits. For purposes of illustration only and in the context of a 5-bit number for further ease of illustration, adding a least significant 1 ("ls1") to 10110 results in 10111 and adding an ls1 to 10111 results in 11000.

Although Bo and Eo (the estimate of 1/Bo) are both truncated to 15 bits in method 100, limitations on the possible values of the most significant bit of each number allow using only 14 bits of Bo to perform the memory lookup and also allow storing in memory values representative of Eo that are only 14 (rather than 15) bits long. More specifically, the most significant bit of "Bo" is known to be "1". In this context, the most significant bit of Bo refers to the bit immediately following the radix point, where Bo is of the form "$0.1x_{n-1} \ldots x_{n-14}$" with "$x_{n-1} \ldots x_{n-14}$" referencing the 2$^{nd}$ to the 15$^{th}$ most significant bits of Bo (alternatively represented as $Bo_{[n-1:n-14]}$). Because the most significant bit of this number is known to be "1," only bits n−1:n−14 of Bo are necessary to retrieve the value of Eo from memory.

Similarly, the most significant bit of Eo is also known to be 1. This can be understood by considering that $\frac{1}{2} \leq Bo < 1$, and therefore the reciprocal of Bo will be greater than 1 and less than or equal to 2. By slightly biasing the estimate of 1/Bo so that it is always at least 1 and is less than 2, one can be assured that Eo is of the form $1.x_n \ldots x_{n-14}$. So in this case, Eo is known to have a leading 1, where the leading, or "most significant" bit is the bit immediately prior to the radix point. With this knowledge in mind, necessary memory size can be minimized. Each of the values stored in memory and used in obtaining Eo can be 14 bits in length (rather than 15). Then a leading 1 is provided to the value read out of the memory to recover the full value of Eo.

At steps 130 and 140, Ao and Bo are scaled using Eo. More specifically, at step 130, Eo and Ao are received and used to calculate $A1=Ao*Eo_{[n:n-24]}$. At step 140, Eo and Bo are received and used to calculate $B1=[Eo*Bo]_{[n-14:n-26]}$. Although Eo*Bo is 39 bits, the initial 14 bits are known to be "1"s. In the illustrated example, only the 13 of the remaining 25 bits are used in the result (this is represented by the subscript "$_{[n-14:n-26]}$").

At step 145, a binary inverse of B1 is computed (i.e. the bits of B1 are flipped). This is recorded as E1=~B1.

At step 150, A1 and E1 are used to compute $Qo=[A1+[A1_{[n:n-12]}*E1]_{[n:n-11]}]_{[n:n-24]}$. This step is explained in further detail in the context of FIG. 2. Qo is representative of the quotient of Ao/Bo.

Step 110 ensures that the result of step 150 is of the form $0.1x_{n-1} \ldots x_{n-22}$. At step 160, the leading "1" is removed to recover Q_frac, the quotient of A_frac/B_frac as Q_frac=$Qo_{[n-1:n-23]}$.

The ratio of the bit length chosen for values pre-stored in the memory used by step 120 to the bit length of the formatted fractional divisor impacts the trade-offs between cost, speed, and accuracy of the illustrated method. In the present example, that ratio is close to 60%. This ratio provides a good trade-off in the context of single precision floating-point division. Accuracy is almost 100%, with only occasional errors in the last significant bit of Q_frac with the benefit of extremely low latency, in the range of 2-4 clock cycles for high frequency clock signals and potentially even fewer clock cycles on slower devices. Those skilled in the art will appreciate that this ratio of 60% may be varied for particular applications without necessarily departing from the spirit and scope of the invention.

In this embodiment, no remainder is calculated and no iterations are needed.

Figure 2:
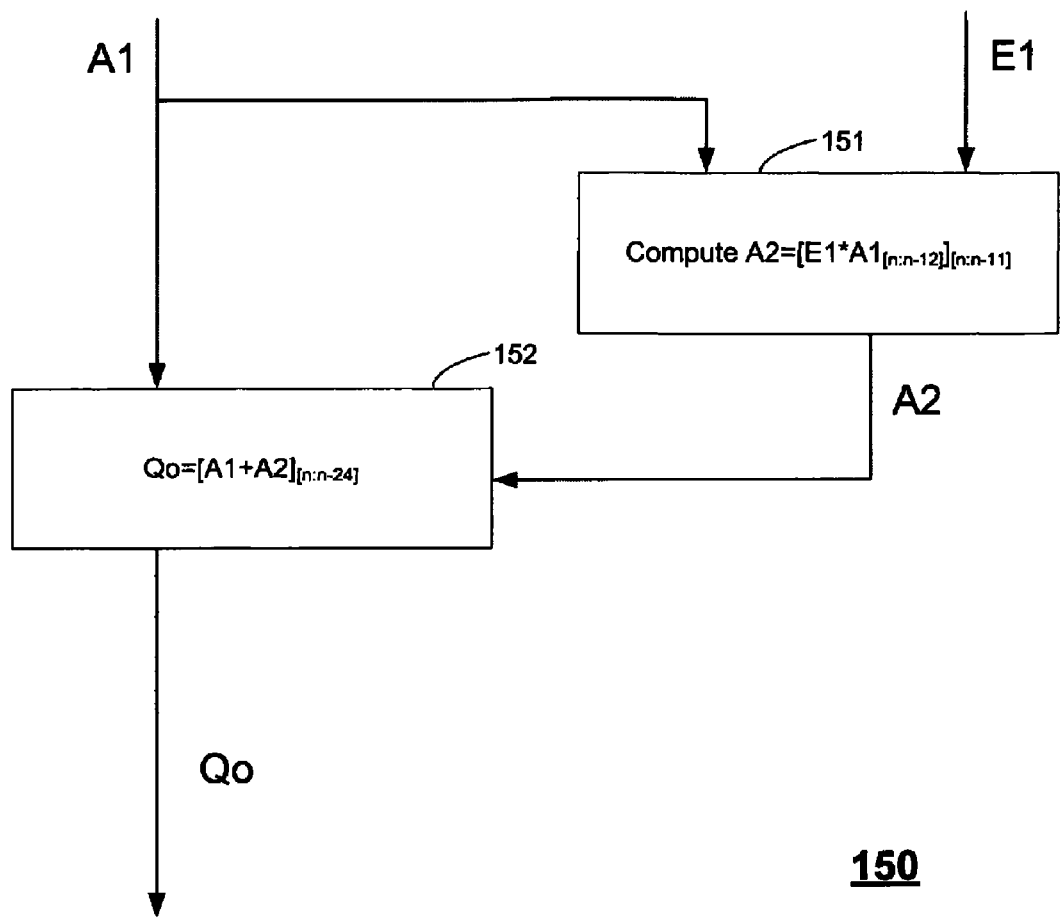
FIG. 2 shows further details of a portion of the embodiment illustrated in FIG. 1.

FIG. 2 illustrates step 150 of method 100 in further detail. A1 and E1 are received at step 151 and are used to compute $A2=[E1*A1_{[n:n-12]}]_{[n:n-11]}$. A1 and A2 are received at step 152 and are used to compute $Qo=[A1+A2]_{[n:n-24]}$.

Figure 3:
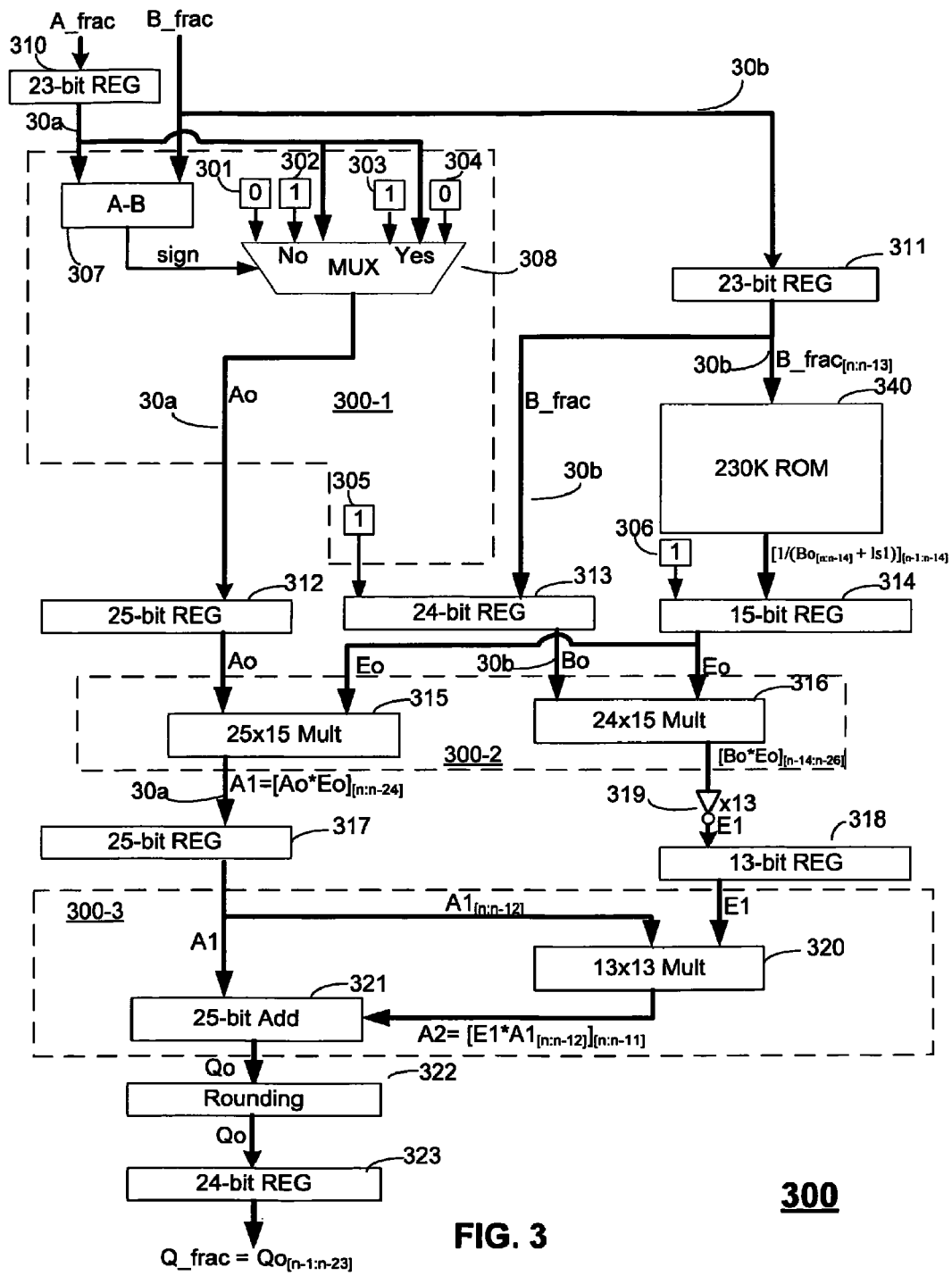
FIG. 3 illustrates a divider circuit consistent with a particular embodiment of the present invention.

FIG. 3 illustrates a divider circuit 300 in accordance with an embodiment of the present invention. Divider circuit 300 includes fractional dividend data path 30*a*, fractional divisor data path 30*b*, pre-scaling circuit 300-1 (which includes comparator 307, multiplexer ("mux") 308, and memory elements 301, 302, 303, 304, and 305), read only memory ("ROM") 340, scaling circuit 300-2 (which includes multipliers 315 and 316), inverters 319, series expansion correction circuit 300-3 (which includes multiplier 320 and adder 321), rounding circuit 322, and registers 310, 311, 312, 313, 314, 317, 318, and 323, all coupled as shown. Register 313 is coupled to memory element 305 and register 314 is coupled to memory element 306.

In the illustrated example, divider circuit 300 receives two numbers, A_frac and B_frac and calculates a quotient Q_frac as will be described further herein. A_frac and B_frac are bits representative of two numbers, each less than 1 and greater than or equal to zero. In a particular example, A_frac and B_frac are two fractional portions of two floating-point numbers. Thus divider 300 may be used in conjunction with other circuitry to carry out floating-point division. When used in conjunction with other circuitry (other circuitry not separately shown), the other circuitry processes the sign and exponent bits of the floating-point dividend and divisor. Divider 300 processes the corresponding fractional bits of the floating-point dividend and divisor.

In the presently illustrated example, it is assumed that A_frac and B_frac are each 23 bits in length and represent the fractional dividend and fractional divisor of two floating-point numbers A and B.

Comparator 307 receives and compares A_frac and B_frac and provides a comparison signal, effectively corresponding to the sign of A-B, to a control input of mux 308. If A-B is negative, then the "yes" input of mux 308 is selected such that the bits provided as Ao to register 310 include a combination of the "1" held in memory element 303, A_frac, and the "0" held in memory element 304 such that Ao=1A_frac0 (i.e. Ao={1, Afrac, 0}). If A-B is positive (or zero), then the "no" input of mux 308 is selected such that the bits provided as Ao to register 310 include a combination of the "0" held in register 301, the "1" held in register 302, and A_frac such that Ao=01A_frac (i.e. Ao={01, A_frac}). In this case, the circuitry processing the exponent bits (not separately shown) needs to increment the exponent bits of the floating-point number A (of which A_frac is the fractional portion), such that the value of the exponent is increased by one to compensate for adding a leading "0" to A_frac.

Register 311 receives B_frac and provides B_frac to register 313. Register 313 also receives a "1" from memory element 305. Thus, the bits in register 313 are representative of Bo and include the 1 from memory element 305 and B_frac such that Bo=1B_frac (i.e. Bo={1, B_frac}). As will be understood by those skilled in the art, in alternative embodiments, the element in register 313 holding the leading bit of Bo could be set to remain at "1" and then separate memory element 305 would not be required.

Memory 340 is coupled to register 311 such that it receives the most significant 14 bits of B_frac. Memory 340 uses the input B_frac$_{[n:n-13]}$ to look up and read out a pre-calculated value of the following number: $[1/(Bo_{[n:n-14]}+ls1)]_{[n-1:n-14]}$, which is then provided to register 314. Register 314 also receives a "1" from memory element 306. Thus, the bits in register 314 include the 1 from memory element 306 and $[1/(Bo_{[n:n-14]}+ls1)]_{[n-1:n-14]}$ such that Eo={1, $[1/(Bo_{[n:n-14]}+ls1)]_{[n-1:n-14]}$}). Register 314 thus holds a total of 15 bits as Eo.

In the illustrated example, memory 340 is approximately 230 kilobits ("230K") in size. The size of the memory required for this particular example can be understood as follows: Although Eo is 15 bits, because the most significant bit of Eo is known to be 1, it does not need not be recorded in memory 340. Therefore, the number read out of memory is really $[1/(Bo_{[n:n-14]}+ls1)]_{[n-1:\ n-14]}$, which is only 14 bits in length. There are $2^{14}$ possible values for this number and each possibility is represented by a 14-bit number. Because $2^{14}*14$ is close to (and slightly less than) 230,000, a 230K memory can, in this example, store a sufficient quantity of values. Of course, in alternative embodiments, the bit length of relevant truncated numbers and the corresponding memory size requirement might be somewhat greater or less than in the illustrated example.

Register 313 is coupled to provide Bo to 24×15 multiplier 316. Multiplier 316 is coupled to also receive Eo from register 314 and thus multiplier 316 multiplies Bo*Eo. Bo*Eo is a 39-bit number. However, the most significant 14 bits are known to be 1. Of the remaining 25 bits, the most significant 13 bits are used. Thus, the bits utilized from the result of multiplier 316 maybe represented as the 13-bit number $[Bo*Eo]_{[n-14:n-26]}$. These bits are inverted by inverters 319 and provided as E1 to register 318. Register 318 provides E1 to 13×13 multiplier 320. Those skilled in the art will appreciate that, in alternative embodiments, inverters such as inverters 319 could just as easily be provided, at the output of register 318 instead of prior to the input.

Register 314 is also coupled to provide Eo to multiplier 315. Multiplier 315 is also coupled to receive Ao from register 312. Thus multiplier 315 calculates Ao*Eo. The most significant 25 bits of the result are provided as A1 to register 317, i.e., A1=$[Ao*Eo]_{[n:n-24]}$. Register 317 is coupled to provide A1 to 25-bit adder 321 and A1$_{[n:n-12]}$ to 13×13 multiplier 320. As indicated above, multiplier 320 is also coupled to receive E1 from register 318. Multiplier 320 calculates A1$_{[n:n-12]}$*E1 and provides the most significant 12 bits of the result to adder 321 as A2, i.e., A2=$[A1_{[n:n-12]})*E1]_{[n:n-11]}$. Adder 321 determines A1+A2 and provides the result, Qo', to rounding circuit 322. Rounding circuits are well known and thus the details of rounding circuit 322 are not discussed further herein. Various well known rounding operations may be selected to implement rounding in a particular embodiment. The result of rounding circuit 322 is provided as Qo to register 323. Qo is a 24 bit number. The least significant 23 bits of Qo may be provided out of register 323 as Q_frac, which corresponds to the quotient of A_frac divided by B_frac.

In the disclosed embodiment, series expansion correction circuit 300-3 comprises multiplier 320 and adder 321 coupled as shown to receive and process E1 and A1. This circuit computes a correction to the quotient in accordance with the principles of series expansion. In alternative embodiments, a correction circuit based on the principles of series expansion may be implemented in a different manner. To cite but one example, using a larger multiplier circuit than that illustrated (multiplier 320) may make it unnecessary to also include a separate adder circuit. Although the illustrated embodiment provides a hardware-efficient approach, those skilled in the art will appreciate that alternative correction circuits based on series expansion principles may be implemented without departing from the spirit and scope of the present invention.

Registers 310, 311, 312, 313, 314, 317, 318, and 323 are provided and coupled to various combinatorial elements in divider circuit 300 to time the operations of divider 300 in view of a clock speed of an electronic device in which divider 300 is implemented. In a device with a high clock speed, such registers are necessary to keep the operations and the input/output data of the divider circuit adequately synchronized. However, as one skilled in the art will appreciate, many or all of these registers could be eliminated in a device that is running at a clock speed of sufficiently low frequency.

Figure 4:
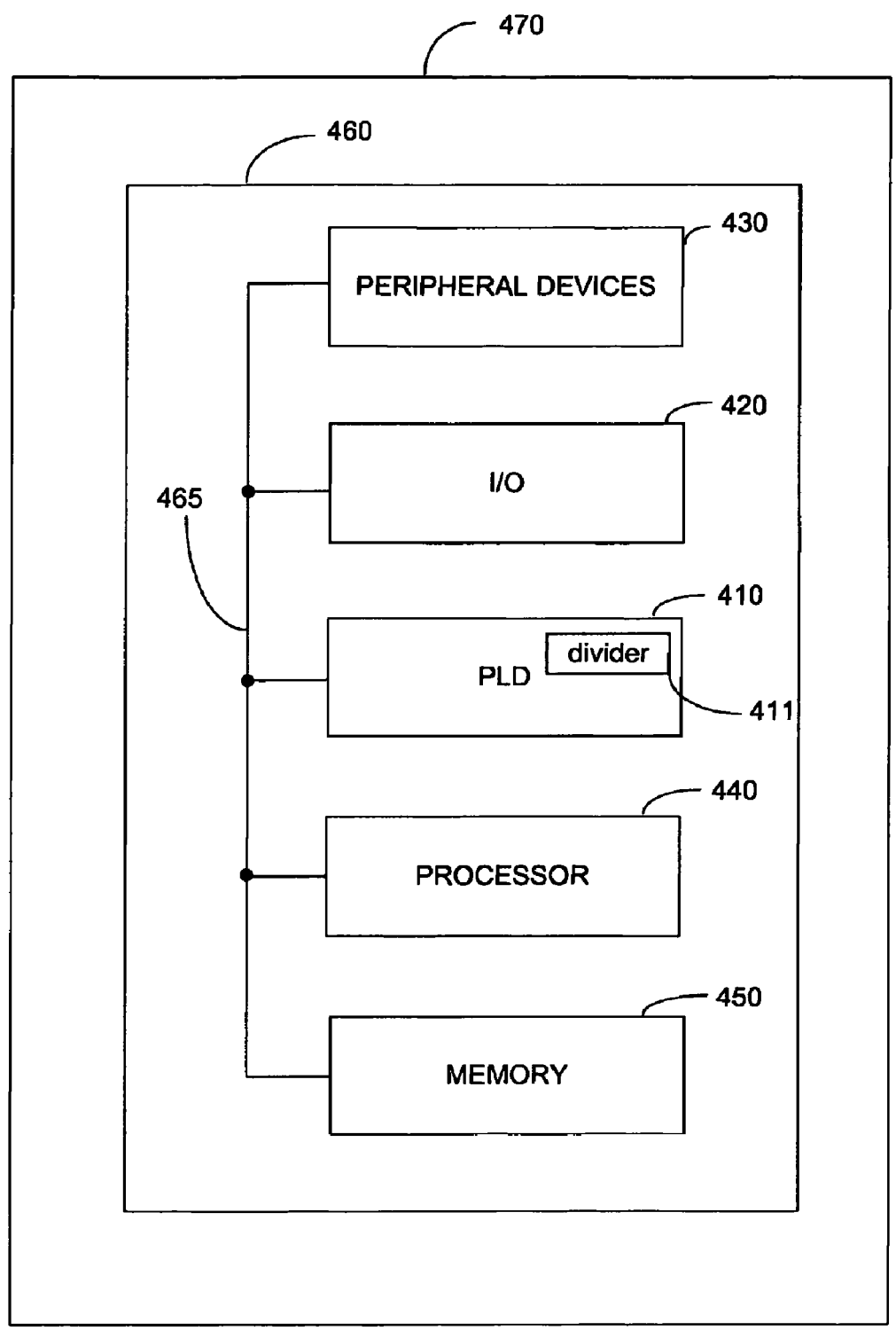
FIG. 4 illustrates a programmable logic device including a divider circuit consistent with an embodiment of the present invention implemented in a data processing system.

FIG. 4 illustrates a PLD 410 including divider 411 in accordance with an embodiment of the present invention. Programmable logic devices ("PLDs") (also sometimes referred to as complex PLDs ("CPLDs"), programmable array logic ("PALs"), programmable logic arrays ("PLAs"), field PLAs ("FPLAs"), erasable PLDs ("EPLDs"), electrically erasable PLDs ("EEPLDs"), logic cell arrays ("LCAs"), field programmable gate arrays ("FPGAs"), or by other names) are well known ICs that provide the advantages of fixed ICs with the flexibility of custom ICs. Such devices are well known in the art and typically provide an "off the shelf" device having at least a portion that can be programmed to meet a user's specific needs. Application specific ICs ("ASICs") have traditionally been fixed ICs, however, it is possible to provide an ASIC that has a portion or portions that are programmable; thus, it is possible for an IC device to have qualities of both an ASIC and a PLD. The term PLD as used herein will be considered broad enough to include such devices.

PLDs typically include blocks of logic elements, sometimes referred to as logic array blocks ("LABs"; also referred to by other names, e.g., "configurable logic blocks," or "CLBs"). Logic elements ("LEs", also referred to by other names, e.g., "logic cells") may include a look-up table ("LUT") or product term, carry-out chain, register, and other elements. LABs (comprising multiple LEs) may be connected to horizontal and vertical lines that may or may not extend the length of the PLD.

PLDs have configuration elements that may be programmed or reprogrammed. Configuration elements may be realized as random access memory ("RAM") bits, flip-flops, electronically erasable programmable read-only memory ("EEPROM"), or other memory elements. Placing new data into the configuration elements programs or reprograms the PLD's logic functions and associated routing pathways. Configuration elements that are field programmable are often implemented as RAM cells (sometimes referred to as "CRAM" or "configuration RAM"). However, many types of configurable elements may be used including static or dynamic random access memory, electrically erasable read-only memory, flash, fuse, and anti-fuse programmable connections. The programming of configuration elements could also be implemented through mask programming during fabrication of the device. While mask programming may have disadvantages relative to some of the field programmable options already listed, it may be useful in certain high volume applications.

FIG. 4 further illustrates PLD 410 implemented in a data processing system 400. Data processing system 400 may include one or more of the following components: a processor 440; memory 450; I/O circuitry 420; and peripheral devices 430. These components are coupled together by a system bus 465 and are populated on a circuit board 460 which is contained in an end-user system 470. A data processing system such as system 400 may include a single end-user system such as end-user system 470 or may include a plurality of systems working together as a data processing system.

System 400 can be used in a wide variety of applications, such as computer networking, data networking, instrumentation, video processing, digital signal processing, or any other application where the advantage of using programmable or reprogrammable logic in system design is desirable. PLD 410 can be used to perform a variety of different logic functions. For example, PLD 410 can be configured as a processor or controller that works in cooperation with processor 440 (or, in alternative embodiments, a PLD might itself act as the sole system processor). PLD 410 may also be used as an arbiter for arbitrating access to shared resources in system 400. In yet another example, PLD 410 can be configured as an interface between processor 440 and one of the other components in system 400. It should be noted that system 400 is only exemplary.

In one embodiment, system 400 is a digital system. As used herein a digital system is not intended to be limited to a purely digital system, but also encompasses hybrid systems that include both digital and analog subsystems.

Although particular embodiments have been described in detail and certain variants have been noted, various other modifications to the embodiments described herein may be made without departing from the spirit and scope of the present invention, thus, the invention is limited only by the appended claims.

What is claimed is:

1. A divider circuit in an electronic device for computing an estimate of a quotient of a fractional dividend and a fractional divisor comprising:
    a memory coupled to a fractional divisor data path, the memory being arranged to store a plurality of values representative of an estimate of a reciprocal of the fractional divisor, a bit length of each stored value of the plurality of stored values being less than a bit length of a pre-scaled fractional divisor;
    a scaling circuit coupled to receive a pre-scaled fractional dividend, the pre-scaled fractional divisor, and bits including the estimate of the reciprocal of the fractional divisor, the scaling circuit being arranged to scale the pre-scaled fractional dividend and the pre-scaled fractional divisor using the bits including the estimate of the reciprocal of the fractional divisor; and
    a series expansion correction circuit coupled to the scaling circuit to compute the estimated quotient of the fractional dividend and the fractional divisor using results of the scaling circuit in accordance with the principles of series expansion.

2. The divider circuit of claim 1 wherein the scaling circuit comprises:
    a first multiplier circuit coupled to receive the pre-scaled fractional divisor and the bits including the estimate of the reciprocal of the fractional divisor; and
    a second multiplier circuit coupled to receive the pre-scaled fractional dividend and the bits including the estimate of the reciprocal of the fractional divisor.

3. The divider circuit of claim 2 wherein the series expansion correction circuit comprises a multiply-add circuit.

4. The divider circuit of claim 3 wherein the multiply-add circuit comprises:
    a third multiplier circuit coupled to the first multiplier circuit via an inverting data path, the third multiplier circuit also being coupled to the second multiplier circuit; and
    an adder circuit coupled to the second and third multiplier circuits.

5. The divider circuit of claim 1 wherein the pre-scaled fractional dividend is obtained from a source fractional dividend and the pre-scaled fractional divisor is obtained from a source fractional divisor, the divider circuit further comprising:
    a pre-scaling circuit configured to receive the source fractional divisor and the source fractional dividend, the pre-scaling circuit being arranged to provide the pre-scaled fractional dividend using the source fractional dividend and to provide the pre-scaled fractional divisor using the source fractional divisor such that $½ ≤$ the pre-scaled fractional divisor$<1$ and $½ ≤$ the pre-scaled fractional dividend divided by the pre-scaled fractional divisor$<1$.

6. The divider circuit of claim 1 wherein the bit length of the pre-scaled fractional divisor is 23 or 24 bits and the bit length of values stored in the memory is greater than or equal to 12 and less than or equal to 16.

7. A programmable logic device comprising the divider circuit of claim 1.

8. A data processing system comprising the programmable logic device of claim 7.

9. The divider circuit of claim 1, wherein the bit length of each of the plurality of stored values is approximately 40%-80% of the bit length of the pre-scaled fractional divisor.

10. A method of using Ao and Bo to divide A_frac by B_frac using an electronic device comprising a memory, wherein Ao and Bo are obtained by pre-scaling A_frac and B_frac, respectively, and wherein A_frac and B_frac are fractional portions of floating-point numbers, the method comprising:
    a) pre-storing a pre-determined quantity of values representative of Eo in the memory wherein Eo includes bits representative of an estimate of a reciprocal of B_frac, a bit length of each pre-stored value of the pre-stored values being less than a bit length of Bo;
    b) reading, using a portion of bits of Bo, a value representative of Eo from the memory;

c) scaling Ao and Bo using Eo; and d) obtaining a quotient of Ao divided by Bo by performing a series expansion correction operation using results of scaling.

11. The method of claim 10 wherein scaling Ao and Bo by Eo comprises:

computing A1=a portion of the bits of Ao*Eo and B1=a portion of the bits of Eo*Bo.

12. The method of claim 11 wherein obtaining a quotient comprises:

performing a binary inverse operation on B1 to obtain E1;

multiplying A1*E1 and taking a portion of the resulting bits to obtain A2; and adding A1+A2.

13. The method of claim 12 further comprising:

pre-scaling A_frac and B_frac as Ao and Bo such that $\frac{1}{2} \leq Bo < 1$ and $\frac{1}{2} \leq Ao/Bo < 1$.

14. The method of claim 10 wherein a bit length of each of the pre-determined quantity of values stored in the memory is approximately 60% of a bit length of Bo.

15. The method of claim 10 wherein the bit length of the fractional divisor is 23 or 24 bits and the bit length of values stored in the memory is greater than or equal to 12 and less than or equal to 16.

16. The method of claim 10, wherein the bit length of each of the pre-determined quantity of values is approximately 40%-80% of the bit length of Bo.

17. A computer program product comprising executable code in a machine readable storage medium, the executable code being for using an electronic device comprising a memory to divide A_frac by B_frac using Ao and Bo, wherein Ao and Bo are obtained by pre-scaling, respectively, A_frac and B_frac, and wherein A_frac and B_frac are fractional portions of two floating-point numbers, by at least:

a) pre-storing a pre-determined quantity of values representative of Eo in the memory wherein Eo is representative of an estimate of a reciprocal of B_frac, a bit length of each pre-stored value of the pre-stored values being approximately less than a bit length of Bo;

b) reading, using a portion of bits of Bo, a value representative of Eo from the memory;

c) scaling Ao and Bo using Eo; and d) obtaining a quotient of Ao divided by Bo by performing a series expansion correction operation using results of scaling.

18. The computer program product of claim 17 wherein the executable code is also for at least:

computing A1=a portion of the bits of Ao*Eo and B1=a portion of the bits of Eo*Bo.

19. The computer program product of claim 18 wherein the executable code is also for at least:

performing a binary inverse operation on B1 to obtain E1;

multiplying A1*E1 and taking a portion of the resulting bits to obtain A2; and adding A1+A2.

20. The computer program product of claim 17, the executable code also being for at least:

pre-scaling A_frac and B_frac as Ao and Bo such that $\frac{1}{2} \leq Bo < 1$ and $\frac{1}{2} \leq Ao/Bo < 1$.

21. The computer program product of claim 17, wherein the bit length of each of the pre-determined quantity of values is approximately 40%-80% of the bit length of Bo.

22. A divider circuit for obtaining a quotient, the divider circuit comprising:

pre-scaling means for pre-scaling a fractional dividend and a fractional divisor;

memory means for storing values representative of estimates of a reciprocal of the pre-scaled fractional divisor;

scaling means for scaling the pre-scaled fractional dividend and the pre-scaled fractional divisor using a value from the memory means representative of an estimate of a reciprocal of the pre-scaled fractional divisor; and means for using results from the scaling means to obtain a quotient representative of an estimate of the fractional dividend divided by the fractional divisor.

* * * * *